US010221259B2

(12) United States Patent
O'Hare et al.

(10) Patent No.: US 10,221,259 B2
(45) Date of Patent: Mar. 5, 2019

(54) SIO₂-LAYERED DOUBLE HYDROXIDE MICROSPHERES AND THEIR USE AS CATALYST SUPPORTS IN ETHYLENE POLYMERISATION (71) Applicant: SCG CHEMICALS CO., LTD., Bangsue Bangkok (TH)

(72) Inventors: Dermot O'Hare, Oxford (GB); Jean-Charles Buffet, Oxford (GB); Chunping Chen, Oxford (GB)

(73) Assignee: SCG CHEMICALS CO., LTD., Bangsue, Bangkok (TH)

( * ) Notice: Subject to any disclaimer, the term of this patent is extended or adjusted under 35 U.S.C. 154(b) by 14 days.

(21) Appl. No.: 15/541,663

(22) PCT Filed: Jan. 6, 2016

(86) PCT No.: PCT/GB2016/050025
§ 371 (c)(1),
(2) Date: Jul. 5, 2017

(87) PCT Pub. No.: WO2016/110699
PCT Pub. Date: Jul. 14, 2016

(65) Prior Publication Data
US 2018/0022839 A1    Jan. 25, 2018

(30) Foreign Application Priority Data

Jan. 6, 2015 (GB) .................................. 1500111.8

(51) Int. Cl.
C08F 4/02      (2006.01)
C08F 4/6592    (2006.01)
(Continued)

(52) U.S. Cl.
CPC ............... *C08F 10/02* (2013.01); *B01J 21/08* (2013.01); *B01J 27/236* (2013.01); *B01J 35/002* (2013.01);
(Continued)

(58) Field of Classification Search
CPC .... C08F 4/02; C08F 4/65916; C08F 4/65912; C08F 10/02
See application file for complete search history.

(56) References Cited

U.S. PATENT DOCUMENTS 5,672,668 A    9/1997 Winter et al.
5,696,045 A   12/1997 Winter et al.
(Continued)

FOREIGN PATENT DOCUMENTS

CA    2133389    4/1995
CA    2133181    5/1995
(Continued)

OTHER PUBLICATIONS

Angpanitcharoen, P. et al., "Supported bis(peralykylindenyl)metallocene Catalysts for Slurry Phase Ethylene Polymerisation," Polyhedron, 2016, 116, 216-222.
(Continued)

*Primary Examiner* — Caixia Lu
(74) *Attorney, Agent, or Firm* — Barnes & Thornburg LLP (57) ABSTRACT

A catalyst system is provided which comprises a solid support material having, on its surface, one or more catalytic transition metal complex wherein the solid support material comprises SiO₂@AMO-LDH microspheres having the formula I: (i) wherein, $M^{z+}$ and $M'^{y+}$ are two different charged metal cations; z=1 or 2; y=3 or 4; 0<x<0.9; b is 0 to 10; c is 0.01 to 10, preferably >0.01 and <10; p>0 q>0; $X^{n-}$ is an anion with n>0, preferably 1−5a=z(1−x)+xy−2; and the
(Continued)

AMO-solvent is an 100% aqueous miscible organic solvent. Preferably, M' in the formula I is Al. Preferably, M in the formula I is Li, Mg or Ca. The catalyst system has use in the polymerization and/or copolymerization of at least one olefin to produce a homopolymer and/or copolymer.

28 Claims, 4 Drawing Sheets

(51) Int. Cl.
$C08F\ 10/02$ (2006.01)
$C08F\ 4/659$ (2006.01)
$B01J\ 37/03$ (2006.01)
$B01J\ 37/06$ (2006.01)
$B01J\ 37/34$ (2006.01)
$B01J\ 21/08$ (2006.01)
$B01J\ 27/236$ (2006.01)
$B01J\ 35/00$ (2006.01)
$B01J\ 35/02$ (2006.01)
$B01J\ 35/08$ (2006.01)
$B01J\ 35/10$ (2006.01)
$B01J\ 31/16$ (2006.01)
$B01J\ 31/22$ (2006.01)

(52) U.S. Cl.
CPC ......... $B01J\ 35/008$ (2013.01); $B01J\ 35/0013$ (2013.01); $B01J\ 35/0086$ (2013.01); $B01J\ 35/023$ (2013.01); $B01J\ 35/08$ (2013.01); $B01J\ 35/1014$ (2013.01); $B01J\ 35/1019$ (2013.01); $B01J\ 37/035$ (2013.01); $B01J\ 37/06$ (2013.01); $B01J\ 37/343$ (2013.01); $C08F\ 4/02$ (2013.01); $C08F\ 4/65916$ (2013.01); $B01J\ 31/1608$ (2013.01); $B01J\ 31/1616$ (2013.01); $B01J\ 31/2295$ (2013.01); $C08F\ 4/65912$ (2013.01); $C08F\ 4/65925$ (2013.01); $C08F\ 4/65927$ (2013.01)

(56) References Cited

U.S. PATENT DOCUMENTS

| | | | |
|---|---|---|---|
| 6,469,188 | B1 | 10/2002 | Miller et al. |
| 6,552,210 | B1 | 4/2003 | Gores et al. |
| 6,583,238 | B1 | 6/2003 | Gores et al. |
| 6,833,945 | B2 | 12/2004 | Tokita et al. |
| 8,980,781 | B2 | 3/2015 | O'Hare et al. |
| 2002/0039962 | A1 | 4/2002 | Schaverien et al. |
| 2003/0176275 | A1 | 9/2003 | Volker et al. |
| 2005/0182266 | A1 | 8/2005 | Schulte et al. |
| 2007/0105712 | A1 | 5/2007 | Panitzky et al. |
| 2007/0232483 | A1 | 10/2007 | Yang et al. |
| 2011/0136994 | A1 | 6/2011 | Ochi et al. |
| 2011/0282017 | A1 | 11/2011 | Kaji et al. |
| 2013/0059990 | A1 | 5/2013 | Kaji et al. |
| 2015/0057418 | A1 | 2/2015 | Kaji et al. |
| 2017/0029537 | A1 | 2/2017 | O'Hare et al. |
| 2017/0306064 | A1 | 10/2017 | O'Hare et al. |

FOREIGN PATENT DOCUMENTS

| | | |
|---|---|---|
| CN | 102294209 | 12/2011 |
| CN | 103525363 | 1/2014 |
| EP | 0645401 | 9/1994 |
| EP | 0704461 | 4/1996 |
| EP | 0707016 | 4/1996 |
| EP | 0646604 | 9/1997 |
| EP | 1055673 | 11/2000 |
| EP | 2570437 | 3/2013 |
| EP | 2706040 | 3/2014 |
| JP | 05125223 | 5/1993 |
| WO | WO1991/009881 | 7/1991 |
| WO | WO1998/043989 | 10/1998 |
| WO | WO1998/046616 | 10/1998 |
| WO | WO2000/026266 | 5/2000 |
| WO | WO2006/117285 | 11/2006 |
| WO | WO2009/077115 | 6/2009 |
| WO | WO2011/051705 | 5/2011 |
| WO | WO2012/048091 | 4/2012 |
| WO | WO2013/146337 | 10/2013 |
| WO | WO2014/051529 | 4/2014 |
| WO | WO2015/159073 | 10/2015 |
| WO | WO2016/075486 | 5/2016 |
| WO | WO2016/075488 | 5/2016 |
| WO | WO2016/110698 | 7/2016 |

OTHER PUBLICATIONS

Arnold, T. et al., "Polymethylaluminoxane Supported Zirconocene Catalysts for Polymerisation of Ethylene," Journal of Organometallic Chemistry, 2016, 822, 85-90.
Arnold, T. et al., "Synthesis, Characterisation, and Polymerisation Studies of Hexamethylindenyl Zirconocenes and Hafnocenes," Journal of Organometallic Chemistry, 2015, 792, 55-65.
Betteridge, P.W. et al., "Crystals Version 12: Software for Guided Crystal Structure Analysis," J. Appl. Crystal., 2013, 36, 1487.
Buffet, J.C. et al., "Synthesis and Characterisation of Permethylindenyl Zirconium Complexes and Their Use in Ethylene Polymerisation," RSC Adv., 2015, 5, 87456-87464.
Buffet, J.C. et al., "Core Shell@LDH Supported Catalysts for Ethylene Polymerisation," Presentation May 29, 2017.
Buffet, Jean-Charles, "Core Shell@LDH Solid Catalysts for Polymerisation," Presentation Jul. 18, 2016.
Buffet, J.C. et al., "Popcorn Shaped Polyethylene Using Polymethylaluminoxane Solid Catalysts," Poster, presented Apr. 10, 2017.
Buffet, J.C. et al., "Popcorn Shaped Polyethylene Using Polymethylaluminoxane Solid Catalysts," Poster, presented Sep. 14, 2017.
Cao, Y. et al., "DNA-Modified Core-Shell Ag/Au Nanoparticles," J. Am. Chem. Soc., 2001, 123, 7961-7962.
Chen, C. et al., "Core-shell SiO2@LDHs with Tuneable Size, Composition and Morphology," Chem. Commun., 2015, 51, 3462-3465.
Chen, C. et al., "Core-shell zeolite@aqueous Miscible Organic-Layered Double Hydroxides," Chem. Sci., 2016, 7, 1457-1461.
Cooper, R. I., et al., "Crystals Enhancements: Dealing with Hydrogen Atoms in Refinement," J. Appl. Cryst., 2010, 43, 1100-1107.
Cosier, J., et al., "A Nitrogen-Gas-Stream Cryostat for General X-ray Diffraction Studies," J. Appl. Cryst., 1986, 19, 105-107.
Lamb, J., "Synthesis of Asymmetric Zirconocenes for Ethylene Polymerisation Catalysis," Presentation for Dalton Younger Members Event, Sep. 7, 2017.
Otwinowski, W. et al., "Processing of X-Ray Diffraction Data Collected in Oscillation Mode," Methods in Enzymology, 2007, vol. 276, 307-326.
Palatinus, L. et al., "Superflip—A Computer Program for the Solution of Crystal Structures by Charge Flipping in Arbitrary Dimensions," J. Appl. Crystal., 2007, 40, 786-790.
Shao, M. et al., "Core-Shell Layered Double Hydroxide Microspheres with Tunable Interior Architecture for Supercapacitors," Chem. Mater., 2012, 24, 1192-1197.
Teng, X. et al., "Platinum-Maghemite Core-Shell Nanoparticles Using a Sequential Synthesis," Am. Chem. Soc., 2003, Nano Letters, vol. 3, No. 2, 261-264.
Licht, E H. et al., "Synthesis and characterization of bis(cyclopentadienyl)zirconium dichloride complexes with ω-fluorenylalkyl or silyl substituents and their application in catalytic ethylene polymerization," Journal of Molecular Catalysis A Chemica, 2000, 164, 9-23.
PCT International Search Report and Written Opinion prepared for PCT/GB2015/053456, dated Feb. 29, 2016, 13 pages.
PCT International Search Report and Written Opinion prepared for PCT/GB2015/053457, dated Feb. 5, 2016, 12 pages.

(56) References Cited

OTHER PUBLICATIONS

PCT International Search Report and Written Opinion prepared for PCT/GB2015/053459, dated Feb. 11, 2016, 9 pages.
PCT International Search Report and Written Opinion prepared for PCT/GB2010/051791, dated Feb. 7, 2011, 9 pages.
PCT International Search Report and Written Opinion prepared for PCT/GB2015/051137, completed Jul. 16, 2015, 8 pages.
PCT International Search Report and Written Opinion prepared for PCT/GB2016/050024, dated Apr. 26, 2016, 10 pages.
Ransom, P. et al., "Synthesis, Characterization, and Polymerization Studies of Ethylenebis(hexamethylindenyl) complexes of Zirconium and Hafnium," Organometallics, 2011, 30, 800-814.
Chen, C. et al, "Tuneable ultra high specific surface area Mg/Al—$CO_3$ layered double hydroxides," Dalton Transactions: The International Journal for Inorganic, Organometallic and Bioinorganic Chemistry, 2015, 44, 16392-16398.
Buffet, J. et al, "Metallocene supported core@LDH catalysts for slurry phase ethylene polymerization," Chem. Communications, 2016, 52, 4076-4079.
Gauthier, W. J. et al., "Elastomeric poly(propylene): Influence of catalyst structure and polymerization conditions on polymer structure and properties," Macromolecules, 1995, 28, 3771-3778.
Silveira, et al., "Metallocenes in ethylene polymerization studied by cyclic and differential pulse voltammetry," Appl. Catal. A: General, 2008, 344, 98-106.
Alias, E M. et al., "Synthesis, Characterisation and Structure of a Strained Ring-Tilted Bis(indenyl) iron Complex," Journal of Organometallic Chemistry, 1997, 528, 47-58.
PCT International Search Report and Written Opinion prepared for PCT/GB2016/050025, dated May 7, 2016, 12 pages.
UK Search Report prepared for GB1500111.8, dated Jul. 13, 2015, 1 page.

SIO₂-LAYERED DOUBLE HYDROXIDE MICROSPHERES AND THEIR USE AS CATALYST SUPPORTS IN ETHYLENE POLYMERISATION

CROSS-REFERENCE TO RELATED APPLICATIONS

This application is a national stage entry under 35 USC § 371 of PCT International Application Number PCT/GB2016/050025, filed Jan. 6, 2016, which claims priority to United Kingdom Patent Application Number 1500111.8, filed Jan. 6, 2015, the entire disclosures of which are expressly incorporated by reference herein.

The present invention relates to $SiO_2$-layered double hydroxide (LDH) core-shell microspheres and to their use as catalyst supports in ethylene polymerisation.

Core shell particles are described in the literature by "core@shell" (for example by Teng et al., Nano Letters, 2003, 3, 261-264, or by "core/shell" (for example J. Am. Chem Soc., 2001, 123, pages 7961-7962). We have adopted the "core@shell" nomenclature as it is emerging as the more commonly accepted abbreviation.

A silica-layered double hydroxide microsphere is known to comprise a silica microsphere having solid LDH attached to its surface. Such a material, denoted as $SiO_2$@LDH, may be a core-shell material where the $SiO_2$ microsphere is a solid sphere, a yolk-shell material where the $SiO_2$ microsphere comprises an outer shell and a smaller $SiO_2$ sphere contained within the outer shell wherein there is a hollow portion between the smaller sphere and the inner surface of the outer shell, or a hollow shell material wherein the $SiO_2$ microsphere has a hollow interior.

Layered double hydroxides (LDHs) are a class of compounds which comprise two or more metal cations and have a layered structure. A review of LDHs is provided in *Structure and Bonding*; Vol. 119, 2005 *Layered Double Hydroxides* ed. X Duan and D. G. Evans. The hydrotalcites, perhaps the most well-known examples of LDHs, have been studied for many years. LDHs can intercalate anions between the layers of the structure.

LDHs have captured much attention in recent years due to their impact across a range of applications, including catalysis, optics, medical science and in inorganic-organic nanocomposites. A new family of dispersible, hydrophobic LDHs using an aqueous miscible organic solvent treatment (AMOST) method has been synthesized. These, so called, AMO-LDHs may exhibit surface areas in excess of 400 m² g⁻¹ and pore volumes in excess of 2.15 cc g⁻¹, which is nearly two orders of magnitude higher than conventional LDHs. AMO-LDHs have a unique chemical composition, which may be defined by the formula A $$[M^{z+}_{1-x}M'^{y+}_x(OH)_2]^{a+}(A^{n-})_{a/n}.bH_2O.c(AMO\text{-solvent}) \quad (A),$$

where $M^{z+}$ and $M'^{y+}$ are metal cations or mixtures of metal cations, z is 1 or 2; and y is 3 or 4, 0<x<1, b=0–10, c=0.01–10, A is a charge compensating anion, n, n>0 (typically 1-5) and a=z(1-x)+xy-2. AMO-solvents are those which are 100% miscible in water. Typically, the AMO-solvent is ethanol, acetone or methanol.

$SiO_2$@LDH microspheres are described by Shao et al, Chem. Mater. 2012, 24, pages 1192-1197. Prior to treatment with a metal precursor solution, the $SiO_2$ microspheres are primed by dispersing them in an Al OOH primer sol for two hours with vigorous agitation followed by centrifuging, washing with ethanol and drying in air for 30 minutes. This priming treatment of the $SiO_2$ microspheres was repeated 10 times before the $SiO_2$ spheres thus coated with a thin Al(OOH) film were autoclaved at 100° C. for 48 hours in a solution of $Ni(NO_3)_2.6H_2O$ and urea. Hollow $SiO_2$@NiAl-LDH microspheres obtained by this process were reported as exhibiting excellent pseudocapacitance performance.

Chen et al, J. Mater. Chem. A, 1, 3877-3880 describes the synthesis of $SiO_2$@MgAl-LDHs having use in the removal of pharmaceutical pollutants from water.

Polyethylene is the most widely used polyolefin with a global production in 2011 of over 75 million tons per year. Innovation in both the synthesis and the properties of polyethylene is still at the forefront in both industry and academia. It is now more than thirty years since the first discoveries of highly active homogeneous catalysts for olefin polymerisation. Since then, intensive research has led to greater control over polymerisation activity and polymer structure than can generally be obtained with the original type of heterogeneous Ziegler-Natta catalysts. Many different supports (e.g. $SiO_2$, $Al_2O_3$, $MgCl_2$ and clays) and immobilisation procedures have been investigated.

The object of the present invention is to provide novel catalyst systems overcoming drawbacks of the prior art, in particular comprising novel supports for heterogeneous ethylene polymerisation and novel ethylene polymerisation catalyst systems comprising a supported catalyst.

This object is achieved by a catalyst system comprising a solid support material having, on its surface, one or more catalytic transition metal complex wherein the solid support material comprises $SiO_2$@AMO-LDH microspheres having the formula I $$(SiO_2)_p@\{[M^{z+}_{(1-x)}M'^{y+}_x(OH)_2]^{a+}(X^{n-})_{a/n}.bH_2O.c(AMO\text{-solvent})\}_q \quad (I)$$

wherein,
$M^{z+}$ and $M'^{y+}$ are two different charged metal cations;
z=1 or 2;
y=3 or 4;
0<x<0.9;
b is 0 to 10;
c is 0.01 to 10;
p>0
q>0;
$X^{n-}$ is an anion with n>0, preferably 1-5
a=z(1-x)+xy-2; and
the AMO-solvent is an 100% aqueous miscible organic solvent.

It is preferred that the solid support material has the formula I in which M' is Al.

It is further preferred that the solid support material has the formula I in which M is Li, Mg or Ca.

Most preferred, the solid support material has the formula I in which $X^{n-}$ is selected from $CO_3^{2-}$, $OH^-$, $F^-$, $Cl^-$, $Br^-$, $I^-$, $SO_4^{2-}$, $NO_3^-$ and $PO_4^{3-}$, preferably $CO_3^{2-}$, $Cl^-$ and $NO_3^-$, or mixtures thereof.

Also preferred is that the solid support material has the formula I in which M is Mg, M' is Al and $X^{n-}$ is $CO_3^-$.

Preferably, the solid support material has the formula I in which AMO-solvent is ethanol, acetone and/or methanol, preferably ethanol or acetone.

More preferably, the catalytic transition metal complex is at least one complex of a metal selected from zirconium, iron, chromium, cobalt, nickel, titanium and hafnium, the complex containing one or more aromatic or heteroaromatic ligands.

It is further preferred that the catalytic transition metal complex is a metallocene containing zirconium or hafnium.

It is most preferred that the catalytic transition metal complex is at least one compound selected from

(EBI)ZrCl$_2$ (SBI$^{2\text{-}Me,4\text{-}Ph}$)ZrCl$_2$ (Ind)$_2$ZrCl$_2$    (Cp$^{nBu}$)$_2$ZrCl$_2$

SB($^{tBu2}$Flu, I*)ZrCl$_2$

In a preferred embodiment, the system is obtainable by a process comprising the step of activating the solid support material with an alkylaluminoxane or triisobutylaluminium (TIBA), triethylaluminium (TEA) or diethylaluminium chloride (DEAC).

In a further preferred embodiment, the alkylaluminoxane is methylaluminoxane (MAO) or modified methylaluminoxane (MMAO).

A further object is achieved by a method of making the catalyst system which comprises (a) providing a solid support material comprising SiO$_2$@AMO-LDH microspheres having the formula (I)

(I)

wherein,

M$^{z+}$ and M'$^{y+}$ are two different charged metal cations;

z=1 or 2;

y=3 or 4;

0<x<0.9;

b is 0 to 10;

c is 0.01 to 10;

p>0, q>0;

X$^{n-}$ is an anion with n>0, preferably 1-5 a=z(1−x)+xy−2; and the AMO-solvent is an aqueous miscible organic solvent, (b) treating the SiO$_2$@AMO-LDH microspheres with at least one catalytic transition metal complex having olefin polymerisation catalytic activity.

Preferably, the solid support material has the formula I in which M' is Al.

More preferably, the solid support material has the formula I in which M is Li, Mg or Ca or mixtures thereof.

Most preferably, the solid support material has the formula I in which X$^{n-}$ is selected from CO$_3^{2-}$, OH$^-$, F$^-$, Cl$^-$, Br$^-$, I$^-$, SO$_4^{2-}$, NO$_3-$ and PO$_4^{3-}$, preferably CO$_3^{2-}$, Cl$^-$ and NO$_3-$, or mixtures thereof.

It is preferred that the solid support material has the formula I in which M is Mg, M' is Al and X$^{n-}$ is CO$_3^-$.

It is further preferred that c, in the formula I for the solid support material is >0 and AMO-solvent is acetone and/or ethanol, preferably acetone or ethanol.

In a more preferred embodiment, the catalytic transition metal complex is at least one complex of a metal selected from zirconium, iron, chromium, cobalt, nickel, titanium and hafnium, the complex containing one or more aromatic or heteroaromatic ligands.

It is preferred that the catalytic transition metal complex is a metallocene containing zirconium or hafnium.

It is further preferred that the catalytic transition metal complex is at least one compound selected from (EBI)ZrCl$_2$ In a further embodiment, the method further comprises a step of calcining the SiO$_2$@AMO-LDH microspheres, before the treating step (b).

In a further embodiment, the method further comprises a step of treating the calcined SiO$_2$@AMO-LDH with an alkylaluminoxane before the treating step (b).

It is preferred that the alkylaluminoxane is methylaluminoxane (MAO) or modified methylaluminoxane (MMAO).

According to a further aspect of the invention, there is provided a catalyst system, as defined herein, obtained, directly obtained or obtainable by a process defined herein.

The object is further achieved by the use of the inventive catalyst system as a catalyst in the polymerisation and/or copolymerisation of at least one olefin to produce a homopolymer and/or co-polymer.

Preferably, the olefin is ethylene.

More preferably, the copolymer comprises 1-10 wt % of a (4-8 C) α-olefin.

Moreover, the object is achieved by a process for forming a polyethylene homopolymer or a polyethylene copolymer which comprises reacting olefin monomers in the presence of the inventive catalyst system.

The object is also achieved by a process for producing a polymer of an olefin which comprises contacting the olefin with the inventive solid catalyst system.

Most preferred, the olefin is ethylene.

Finally, it is preferred that the process is performed at a temperature of 60 to 100° C., preferably 70 to 80° C.

A silica-layered double hydroxide microsphere is known to comprise a silica microsphere having solid AMO-LDH attached to its surface. Such a material, denoted as SiO$_2$@AMO-LDH, may be a core-shell material where the SiO$_2$ microsphere is a solid sphere, a yolk-shell material where the SiO$_2$ microsphere comprises an outer shell and a smaller SiO$_2$ sphere contained within the outer shell wherein there is a hollow portion between the smaller sphere and the inner surface of the outer shell, or a hollow shell material wherein the SiO$_2$ microsphere has a hollow interior.

The SiO$_2$ microspheres used in the preparation of the SiO$_2$@AMO-LDH microspheres used as the solid support material may be solid, yolk-shell or hollow microspheres and are commercially-available in a variety of sizes (diameters). They can be prepared easily and quickly and at relatively low cost. In addition, the silica microspheres are negatively charged, which compliments the positive charged surface of AMO-LDHs, allowing for additive-free binding of the AMO-LDH by electrostatic interactions. Most importantly, the silica spheres can be prepared so that they are monodispersed, preventing aggregation of the AMO-LDH nanosheets. SiO$_2$ microspheres may be prepared by the Stöber process or by seeded growth, providing different levels of control over the particle size. In the Examples, provided herein, three sizes of silica spheres were synthesised, 300 nm, 550 nm and 800 nm.

In an embodiment, the silica microspheres do not contain any iron.

In an embodiment, the silica microspheres comprise greater than 75% w/w SiO$_2$. Suitably, silica microspheres comprise greater than 85% w/w SiO$_2$. More suitably, the silica microspheres comprise greater than 95% w/w SiO$_2$. Most suitably, the silica microspheres comprise greater than 98% w/w SiO$_2$.

In another embodiment, the silica microspheres consist essentially of SiO$_2$.

In another embodiment, the silica microspheres consist of SiO$_2$.

In another embodiment, the SiO$_2$ microspheres have a diameter of between 0.15 μm and 8 μm. Suitably, the SiO$_2$ microspheres have a diameter of between 0.15 μm and 2 μm. More suitably, the SiO$_2$ microspheres have a diameter of between 0.15 μm and 1 μm. Most suitably, the SiO$_2$ microspheres have a diameter of between 0.2 μm and 0.8 μm The SiO$_2$@AMO-LDHs used as the solid support material in the catalyst system of the invention has the formula I (I)

wherein,
M$^{z+}$ and M$^{y+}$ are two different charged metal cations;
z=1 or 2;
y=3 or 4;
0<x<0.9;
b is 0 to 10;
c is 0.01 to 10, preferably c>0.01 and <10;
p>0,
q>0;

$X^{n-}$ is an anion;
n is the charge on the anion, n>0 (typically 1-5);
a=z(1−x)+xy−2; and
AMO-solvent is an aqueous miscible organic solvent.

These materials are made by a method which comprises the steps:
(a) contacting silica microspheres within a metal ion containing solution containing metal ions $M^{z+}$ and $M^{v+}$ and anion $X^{n+}$ in the presence of a base;
(b) collecting the product; and
(c) treating the product with AMO-solvent and recovering the solvent treated material.

As stated above, $M^{z+}$ and $M^{v+}$ are different charged metal cations. Having regard to the fact that z=1 or 2, M will be either a monovalent metal cation or a divalent metal cation. When z=1, M is either a single monovalent metal cation or two or more different monovalent metal cations. When z=2, M is either a single divalent metal cation or two or more different divalent metal cations. In an embodiment, z=2, i.e. M is one or more divalent metal cations. M', in view of the fact that y=3 or 4, will be a trivalent metal cation or a tetravalent metal cation. When z=3, M' is either a single trivalent metal cation or two or more different trivalent metal cations. When z=4, M' is either a single tetravalent metal cation or two or more different tetravalent metal cations. In an embodiment, y=3, i.e. M' is one or more trivalent metal cations.

A preferred example of a monovalent metal, for M, is Li. Examples of divalent metals, for M, include Ca, Mg, Zn, Fe and Ni and mixtures of two or more of these. Preferably, the divalent metal, if present, is Ca or Mg. Examples of metals, for M', include Al, Ga and Fe. Preferably, M' is a trivalent cation, e.g. Al. Preferably, the LDH will be a Li—Al, a Mg—Al or a Ca—Al AMO-LDH.

The anion $X^{n+}$ in the LDH is any appropriate inorganic or organic anion. Examples of anions that may be used, as $X^{n+}$, in the AMO-LDH include carbonate, nitrate, borate, sulphate, phosphate and halide ($F^−$, $Cl^−$, $Br^−$, $I^−$) anions. Preferably, the anion $X^{n-}$ is selected from $CO_3^{2-}$, $NO_3^-$ and $Cl^-$.

The AMO-solvent is any aqueous miscible organic solvent, preferably a solvent which is 100% miscible with water. Examples of suitable water-miscible organic solvents for use in the present invention include one or more of acetone, acetonitrile, dimethylformamide, dimethylsulfoxide, dioxane, ethanol, methanol, n-propanol, isopropanol, or tetrahydrofuran. Preferably, the AMO-solvent is selected from acetone, methanol and ethanol, with ethanol or acetone being the most preferred solvent.

According to one preferred embodiment, the layered double hydroxides are those having the general formula I above
in which M is a divalent metal cation;
M' is a trivalent metal cation; and
c is a number from 0.01 to 10, preferably >0.01 and <10, which gives compounds optionally hydrated with a stoichiometric amount or a non-stoichiometric amount of water and/or an aqueous-miscible organic solvent (AMO-solvent), such as ethanol or acetone.

Preferably, in the AMO-LDH of the above formula, M is Mg or Ca and M' is Al. The counter anion $X^{n-}$ is typically selected from $CO_3^{2-}$, $OH^-$, $F^-$, $Cl^-$, $Br^-$, $I^-$, $SO_4^{2-}$, $NO_3^-$ and $PO_4^{3-}$. Preferably, the LDH will be one wherein M is Mg, M' is Al and $X^{n-}$ is $CO_3^{2-}$.

In carrying out the method of preparing the $SiO_2$@AMO-LDHs, typically the $SiO_2$ microspheres are dispersed in an aqueous solution containing the desired anion salt, for example $Na_2CO_3$. A metal precursor solution, i.e. a solution combining the required monovalent or divalent metal cations and the required trivalent cations may then be added, preferably drop-wise, into the dispersion of the $SiO_2$ microspheres. Preferably, the addition of the metal precursor solution is carried out under stirring. The pH of the reaction solution is preferably controlled within the pH range 8 to 11, more preferably 9 to 10. At pH 9 AMO-LDH nanosheets are attached to the surface of the $SiO_2$ microspheres. When pH was adjusted to 10, it is clearly observed that a uniform layer of LDH nanosheets is homogeneously grown on the surface of the microspheres with hierarchal texture. The AMO-LDH layer thickness achieved at pH 10 is typically 80-110 nm. Increasing the pH to 11 also shows full coverage of the surface with AMO-LDH nanosheets. Furthermore, an increase in pH from 9 to 11 demonstrates that the $SiO_2$ microspheres begin to dissolve, progressing from solid $SiO_2$ microspheres (core-shell) at pH 9 to yolk-shell spheres at pH 10 to hollow shell spheres at pH 11. Typically, NaOH may be used to adjust the pH of the solution.

In an embodiment, the method of the present invention does not include ammonia.

In a preferred embodiment, the silica-layered double hydroxide microspheres have specific surface area of at least 100 $m^2/g$, preferably at least 177 $m^2/g$, preferably at least 177 $m^2/g$, and more preferably at least 200 $m^2/g$, and even more preferably at least 250 $m^2/g$.

Suitably, the solid silica-layered double hydroxide microspheres have specific surface area of at least 100 $m^2/g$.

Suitably, the yolk-shell silica-layered double hydroxide microspheres have specific surface area of at least 110 $m^2/g$.

Suitably, the hollow-shell silica-layered double hydroxide microspheres have specific surface area of at least 130 $m^2/g$.

During the reaction, the AMO-LDH produced from the metal precursor solution reaction is formed on the $SiO_2$ surfaces of the microspheres as nanosheets.

The obtained solid product may be collected from the aqueous medium by centrifugation. Typically, the centrifuged solid may be re-dispersed in water and then collected again by centrifuge. Preferably, the collection and re-dispersion steps are repeated twice. In order to obtain a product containing AMO-solvent, the material obtained after the centrifugation/re-dispersion procedure described above is washed with, and preferably also re-dispersed in, the desired solvent, for instance ethanol or acetone. If re-dispersion is employed, the dispersion is preferably stirred. Stirring for more than 2 hours in the solvent is preferable. The final product may then be collected from the solvent and then dried, typically in an oven for several hours.

In an embodiment, the LDH is formed in situ. Suitably, the LDH is formed and coated onto the silica microspheres in situ.

The growth of AMO-LDH nanosheets on the surface of the $SiO_2$ microspheres is "tuneable". That is to say, by varying the chemistry of the precursor solution and the process conditions, for instance the pH of the reaction medium, temperature of the reaction and the rate of addition of the precursor solution to the dispersion of $SiO_2$ microspheres, the extent of, and the length and/or thickness of, the AMO-LDH nanosheets formed on the $SiO_2$ surface can be varied.

The production of the $SiO_2$@AMO-LDH microspheres according to the invention can be carried out as a batch process or, with appropriate replenishment of reactants, as a continuous process.

The catalyst system of the invention comprises one or more catalytic transition metal complex. By the term "transition metal" it is meant a d-block metal, examples of which include, but are not limited to, zirconium, chromium, titanium and hafnium. The transition metal will be complexed with one or more ligands, or aromatic or heteroaromatic cyclic compounds to preferably achieve complexes which may be summarized under the term metallocene. Such aromatic compounds, useful for complexing with the transition metal, include optionally-substituted cyclopentadiene, optionally substituted indene and optionally-substituted pentalene. The aromatic compound used to complex the transition metal may, further, contain two linked, optionally-substituted cyclopentadiene groups or two linked, optionally-substituted indene and optionally-substituted pentalene groups. In such linked moieties, the linking group may be provided by a lower alkylene group.

Examples of catalysts include known polymerisation catalysts, for example metallocenes, constrained geometry, Fl complexes and diimino complexes.

According to one embodiment of the invention, the transition metal complex used in the catalyst system will be selected from

(EBI)ZrCl$_2$ (SBI$^{2\text{-}Me,4\text{-}Ph}$)ZrCl$_2$ (Ind)$_2$ZrCl$_2$    (Cp$^{nBu}$)$_2$ZrCl$_2$ SB($^{tBu2}$Flu, I*)ZrCl$_2$ In the formulae shown above, EBI is ethylene bridged indene, 2-Me,4-$^{Ph}$SBI is dimethylsilyl bridged 2-methyl,4-phenylindene, $^{nBu}$Cp is n-butylcyclopentadiene.

As stated above, the catalyst system of the invention may contain more than one catalytic transition metal complex.

The catalyst system of the present invention may be made by a process comprising treating the SiO$_2$@AMO-LDH, as described above, with at least one transition metal complex, as described above, having catalytic activity in the polymerisation of olefins. Typically, the treatment will be carried out in a slurry of the SiO$_2$@AMO-LDH in an organic solvent, for example toluene. According to this slurry process, a slurry of the SiO$_2$@AMO-LDH in, e.g. toluene, is prepared. Separately, a solution of the catalytic transition metal complex in, e.g. toluene, is prepared and then added to the SiO$_2$@AMO-LDH containing slurry. The resulting combined mixture is then heated, for instance at 80° C., for a period of time. The solid product may then be filtered from the solvent and dried under vacuum.

Preferably, the SiO$_2$@AMO-LDH is heat-treated, for instance at 110 to 250° C. for a period of time, before it is slurried in the organic solvent.

Preferably, the SiO$_2$@AMO-LDH is contacted with an activator, for example an alkylaluminium activator such as methylaluminoxane, before or after being treated with the catalytic transition metal complex. Typically, methylaluminoxane is dissolved in a solvent, e.g. toluene, and the resulting solution is added to a slurry of calcined SiO$_2$@AMO-LDH. The slurry may then be heated, for instance at 80° C., for 1-3 h prior to being filtered from the solvent and dried. According to a preferred embodiment, the SiO$_2$@ AMO-LDH is treated with methylaluminoxane before being treated with a solution of the catalytic material.

The catalytic compounds will be present on the surface of the solid support material. For instance, they may be present on the surface as a result of adsorption, absorption or chemical interactions.

The present invention also provides a process for producing a polymer of an olefin which comprises contacting the olefin with a catalyst system according to the invention, as described above.

Thus, as discussed hereinbefore, the present invention also provides the use of a composition defined herein as a polymerization catalyst, in particular a polyethylene polymerization catalyst.

In one embodiment, the polyethylene is a homopolymer made from polymerized ethene monomers.

In another embodiment, the polyethylene is a copolymer made from polymerized ethene monomers comprising 1-10 wt % of (4-8 C) α-olefin (by total weight of the monomers).

Suitably, the (4-8 C) α-olefin is 1-butene, 1-hexene, 1-octene, or a mixture thereof.

As discussed hereinbefore, the present invention also provides a process for forming a polyolefin (e.g. a polyethylene) which comprises reacting olefin monomers in the presence of a composition defined herein.

In another embodiment, the olefin monomers are ethene monomers.

In another embodiment, the olefin monomers are ethene monomers comprising 1-10 wt % of (4-8 C) α-olefin (by total weight of the monomers). Suitably, the (4-8 C) α-olefin is 1-butene, 1-hexene, 1-octene, or a mixture thereof.

A person skilled in the art of olefin polymerization will be able to select suitable reaction conditions (e.g. temperature, pressures, reaction times etc.) for such a polymerization reaction. A person skilled in the art will also be able to manipulate the process parameters in order to produce a polyolefin having particular properties.

In a particular embodiment, the polyolefin is polyethylene.

PARTICULARLY PREFERRED EMBODIMENTS

The following represent particular embodiments of the silica-layered double hydroxide:

1.1 The Silica-Layered Double Hydroxide Microspheres have the General Formula I wherein, $M^{z+}$ is selected from $Li^+$, $Ca^{2+}$, $Ni^{2+}$ or $Mg^{2+}$, and $M'^{y+}$ is $Al^{3+}$ or $Fe^{3+}$;

$0<x<0.9$;

b is 0 to 10;

c is 0 to 10;

p>0, q>0;

$X^{n-}$ is selected from carbonate, hydroxide, nitrate, borate, sulphate, phosphate and halide ($F^-$, $Cl^-$, $Br^-$, $I^-$) anions; with n>0 (preferably 1-5)

a=z(1−x)+xy−2; and the AMO-solvent is selected from methanol, ethanol or acetone.

1.2 The Silica-Layered Double Hydroxide Microspheres have the General Formula I wherein, $M^{z+}$ is selected from $Li^+$, $Ca^{2+}$, $Ni^{2+}$ or $Mg^{2+}$, and $M'^{y+}$ is $Al^{3+}$;

$0<x<0.9$;

b is 0 to 10;

c is 0 to 10;

p>0, q>0;

$X^{n-}$ is selected from $CO_3^{2-}$, $NO_3^-$ or $Cl^-$; with n>0 (preferably 1-5)

a=z(1−x)+xy−2; and the AMO-solvent is ethanol or acetone.

1.3 The Silica-Layered Double Hydroxide Microspheres have the General Formula Ia wherein, $M^{z+}$ is selected from $Li^+$, $Ca^{2+}$, $Ni^{2+}$ or $Mg^{2+}$;

$0<x<0.9$;

b is 0 to 10;

c is 0 to 10;

p>0, q>0;

$X^{n-}$ is selected from $CO_3^{2-}$, $NO_3^-$ or $Cl^-$; with n>0 (preferably 1-5)

a=z(1−x)+xy−2; and the AMO-solvent is ethanol or acetone.

1.4 The Silica-Layered Double Hydroxide Microspheres have the General Formula Ia wherein, $0<x<0.9$;

b is 0 to 10;

c is 0 to 10;

p>0, q>0;

$X^{n-}$ is selected from $CO_3^{2-}$, $NO_3^-$ or $Cl^-$; with n>0 (preferably 1-5)

a=z(1−x)+xy−2; and the AMO-solvent is ethanol or acetone.

1.5 The Silica-Layered Double Hydroxide Microspheres have the General Formula Ib wherein, $0<x<0.9$;

b is 0 to 10;

c is 0 to 10;

p>0, q>0;

a=z(1−x)+xy−2.

The following represent particular embodiments of the catalyst system:

2.1 The Catalyst System Comprises a Solid Support Material Having, on its Surface, One or More Catalytic Transition Metal Complexes Selected from:

(EBI)ZrCl$_2$ (SBI$^{2\text{-}Me,4\text{-}Ph}$)ZrCl$_2$ (Ind)$_2$ZrCl$_2$    (Cp$^{nBu}$)$_2$ZrCl$_2$ SB($^{tBu2}$Flu, I*)ZrCl$_2$ wherein the solid support material comprises SiO$_2$@AMO-LDH microspheres having the formula I $(SiO_2)_p@\{[M^{z+}{}_{(1-x)}M^{y+}{}_x(OH)_2]^{a+}(X^{n-})_{a/n} \cdot bH_2O \cdot c(\text{AMO-solvent})\}_q$     (I)

wherein, $M^{z+}$ is selected from Li$^+$, Ca$^{2+}$, Ni$^{2+}$ or Mg$^{2+}$, and $M^{y+}$ is Al$^{3+}$ or Fe$^{3+}$;

0<x<0.9;

b is 0 to 10;

c is 0 to 10;

p>0, q>0;

$X^{n-}$ is selected from carbonate, hydroxide, nitrate, borate, sulphate, phosphate and halide (F$^-$, Cl$^-$, Br$^-$, I$^-$) anions; with n>0 (preferably 1-5)

a=z(1-x)+xy-2; and the AMO-solvent is selected from methanol, ethanol or acetone.

2.2 The Catalyst System Comprises a Solid Support Material Having, on its Surface, One or More Catalytic Transition Metal Complexes Selected from:

(EBI)ZrCl$_2$ (SBI$^{2\text{-}Me,4\text{-}Ph}$)ZrCl$_2$ (Ind)$_2$ZrCl$_2$    (Cp$^{nBu}$)$_2$ZrCl$_2$ SB($^{tBu2}$Flu, I*)ZrCl$_2$ wherein the solid support material comprises SiO$_2$@AMO-LDH microspheres having the formula I (Ia)

wherein,

M$^{z+}$ is selected from Li$^+$, Ca$^{2+}$, Ni$^{2+}$ or Mg$^{2+}$;

0<x<0.9;

b is 0 to 10;

c is 0 to 10;

p>0, q>0;

X$^{n-}$ is selected from CO$_3^{2-}$, NO$_3^-$ or Cl$^-$; with n>0 (preferably 1-5)

a=z(1−x)+xy−2; and the AMO-solvent is ethanol or acetone.

Preferred, suitable, and optional features of any one particular aspect of the present invention are also preferred, suitable, and optional features of any other aspect.

Experimental Details

Preparation of Silica (SiO$_2$) Nanoparticles

Stöber Method.

The monodispersed silica spheres were synthesised using the Stöber method. Tetraethyl orthosilicate (TEOS) (amounts shown below) was added to a mixed solution of ammonia (35 wt %), deionised water and ethanol. The white suspension was left to stir vigorously for 17 h. The volume of deionised water and ethanol remained constant (30 mL and 50 mL, respectively). The volume of TEOS and ammonia was varied to achieve the desired size of silica sphere (13.7 mL, 9.15 mL and 3 mL of TEOS with 15 mL, 10 mL and 5 mL of ammonia for 800 nm, 550 nm and 300 nm silica spheres, respectively). The final solid was washed with ethanol and water, until washings were pH 7, followed by drying under vacuum overnight.

Seeded Growth Method.

Seeded growth is a two-stage synthesis. The first stage prepares the 'seeds'. TEOS (1 mL) diluted in ethanol (4 mL), was added to a mixed solution of ammonia (10 mL, 35 wt %) and ethanol (46 mL) and left to stir vigorously for 2 h. Keeping the reaction conditions the same for the second stage of synthesis, the calculated amount of TEOS diluted in 4× volume of ethanol was added to the seed suspension at a rate of 6 mL/h. After all the TEOS was added the reaction was left to stir for a further 2 h to make sure the particles had reached their final size. The final solid was washed with ethanol (240 mL) and dried under vacuum overnight.

Preparation of Silica@LDH Nanoparticles (SiO$_2$@AMO-LDH).

The silica@LDH particles were synthesised via the coprecipitation method. Silica spheres (100 mg) were dispersed in deionised water (20 mL) using ultrasound treatment. After 30 min, the desired anion salt (0.96 mmol), Na$_2$CO$_3$, was added to the solution and a further 5 min of sonication was carried out to form solution A. Next an aqueous solution (19.2 mL) containing M$^{2+}$(NO$_3$)$_2$.6H$_2$O (0.96 mmol) (M$^{2+}$=Mg, Ni) and M$^{3+}$(NO$_3$)$_3$.9H$_2$O (0.48 mmol) (M$^{3+}$=Al, Fe) was added at a rate of 60 mL/h to solution under vigorous stirring. The pH of the reaction solution was controlled with the addition of 1 M NaOH by an autotitrator, or was pre-set by the 'Ammonia method', where ammonia (0.8 mL, 35 wt %) was added at the beginning of the reaction. The obtained solid was collected with centrifugation at 4000 rpm for 5 min and then re-dispersed in deionised water (40 mL) and stirred for 1 h. The collection and re-dispersion was repeated twice. The suspension was then dried under vacuum for materials characterisation.

Aqueous Miscible Organic Solvent Treatment.

For the AMOST method, the silica@AMO-LDHs are initially formed using the previous procedures. However, before final isolation, the solid was washed with acetone (40 mL) and then re-dispersed in acetone (40 mL) and left to stir overnight. The suspension was then dried under vacuum for materials characterisation.

Silica@AMO-LDH (SiO$_2$@AMO-LDH) Characterisation.

Silica@AMO-LDHs synthesised at room temperature with different pHs. Si NMR: pH 10:δ (ppm)−108 (s), −99 (s), −86 (s); pH 11:δ (ppm)−135−−75. Al NMR: pH 10:δ (ppm) 9.6 (s), 61 (s); pH 11:9.2 (s), 56 (s). Silica@AMO-LDHs synthesised at pH 10 at different temperatures. Si NMR: room temperature: δ (ppm)−108 (s), −99 (s), −86 (s); 40° C.: δ (ppm)−135−−75. Al NMR: room temperature: δ (ppm) 9.6 (s), 61 (s); 40° C.:9.2 (s), 56 (s). Silica@AMO-LDHs synthesised with the AMOST method at room temperature and pH 10. Si NMR: δ (ppm) −110 (s), −101 (s), −87 (s). Al NMR:δ (ppm) 9.4 (s), 55 (s).

Silica@AMO-LDH and AMO-LDH as Catalyst Supports.

The silica@AMO-LDH used as a catalyst support contained a silica core (SiO$_2$) (550 nm) prepared via the seeded growth method and an LDH layer (Mg/Al 2:1 with CO$_3^{2-}$ anion) grown at pH 10 at room temperature which was treated with the AMOST method. The AMO-LDH used for comparison was an LDH (Mg/Al 2:1 with CO$_3^{2-}$ anion) synthesised under the same conditions and was treated with the AMOST method. Silica@AMO-LDH and AMO-LDH samples were thermally treated at 150° C. for 6 h under vacuum (10$^{-2}$ mbar). Two equivalents of thermally treated silica@AMO-LDH (750 mg) and one equivalent of methylaluminoxane (375 mg) were heated in toluene (40 mL) at 80° C. for 2 h, with swirling to the reaction every 10 minutes. The solvent was then removed under vacuum and the colourless solid dried in vacuo for 4 h to afford silica@AMO-LDH/MAO, yield: 89%. Similar process was carried out with the AMO-LDH, yield 84%. Finally, one equivalent of silica@AMO-LDH/MAO (500 mg) and 0.01 equivalent of yellow [(EBI)ZrCl$_2$] (12 mg) were heated in toluene (25 mL) at 80° C. for 2 h, with swirling to the reaction every 10 minutes. The reaction mixture was then left to cool and the solid was allowed to settle. The solid went from colourless to orange in colour, and the solution was left colourless. The solvent was then removed under vacuum and dried in vacuo for 4 h to afford silica@AMO-LDH/MAO-[(EBI)ZrCl$_2$] yield: 89%. The same process was carried out with the AMO-LDH/MAO-[(EBI)ZrCl$_2$], yield: 93%.

Ethylene Polymerisation Studies.

The catalysts were tested for their ability to act as a catalyst for ethylene polymerisation under slurry conditions in the presence of TIBA ([TIBA]$_0$/[Zr]$_0$=1000). The reactions were performed with ethylene (2 bar) in a 200 mL ampoule, with the catalyst precursor (10 mg) suspended in hexane (50 mL). The reactions were run for 15-120 minutes at 50-90° C. controlled by heating in an oil bath. The polyethylene product was washed with pentane (3×50 mL) and the resulting polyethylene was filtered through a sintered glass frit.

Figure 1:
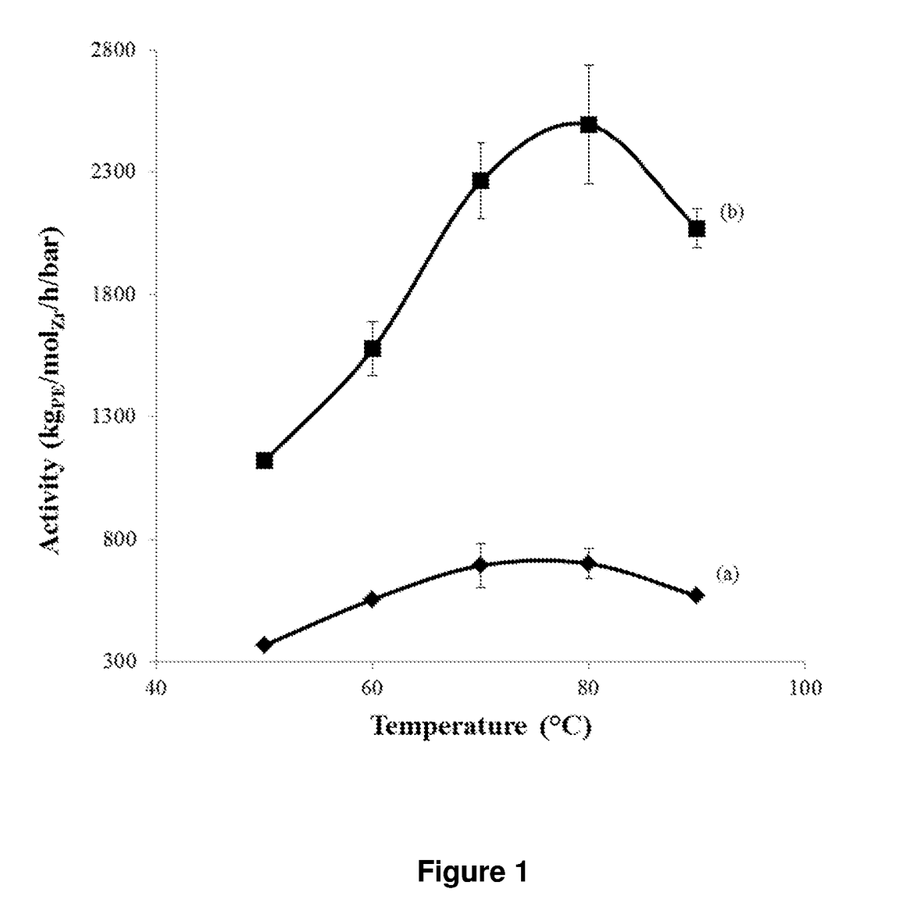
FIG. 1 is a chart showing polymerisation activities of the catalyst supported metallocene complexes at temperatures from 50 to 90° C.

The polymerisation activity of the catalyst supported metallocene complexes plotted against temperature is shown in FIG. 1.

FIG. 1 Polymerisation activities of the catalyst supported metallocene complexes at temperatures from 50 to 90° C. (a) AMO-LDH/MAO-[(EBI)ZrCl$_2$] and (b) silica@AMO-LDH/MAO-[(EBI)ZrCl$_2$]. Polymerisation conditions: 50 mL Hexane, 2 bar Ethylene, 1 h, [TIBA]$_0$/[Zr]$_0$=1000. AMO-LDH/MAO-[(EBI)ZrCl$_2$] (a) shows a bell-shaped activity curve, typical for the immobilised [EBI(ZrCl$_2$)], with the optimum temperature for polymerisation to be found between 70 and 80° C. (activity of 702 kg$_{PE}$/molz$_r$/h/bar at 80° C.), FIG. 1. The curve can be explained by the increase of the propagation rate with temperature, followed by the termination rate increasing after the optimum temperature. At 80° C., when silica@AMO-LDH/MAO-[(EBI)ZrCl$_2$] was used, the activity is 3.5 times higher, 2494 kg$_{PE}$/molz$_r$/h/bar, than the activity of the AMO-LDH/MAO-[(EBI)ZrCl$_2$]. The activities of this catalyst are very high on the Gibson scale. Above these temperatures we see a sharp drop in the activity of the complexes, as is expected as the rate of deactivation increases. This significant result demonstrates the advantage of the hierarchical structure; growing the LDH on the surface of silica spheres has resulted in a more active catalyst support.

TABLE 1

Polymerisation data demonstrating the molecular weights ($M_w$) and polydispersities ($M_w/M_n$) with Temperature varying from 50 to 90° C. for 1 h using silica@AMO-LDH/MAO-[(EBI)ZrCl$_2$]

| Temperature (° C.) | $M_w$ (g/mol) | $M_w/M_n$ |
|---|---|---|
| 50 | 198251 | 5.60 |
| 60 | 171780 | 4.87 |
| 70 | 152496 | 4.99 |
| 80 | 100322 | 4.10 |
| 90 | 84265 | 3.93 |

TABLE 2

Polymerisation data demonstrating the molecular weights ($M_w$) and polydispersities ($M_w/M_n$) with Temperature varying from 50 to 90° C. for 1 h using AMO-LDH/MAO-[(EBI)ZrCl$_2$]

| Temperature (° C.) | $M_w$ (g/mol) | $M_w/M_n$ |
|---|---|---|
| 50 | 276454 | 5.33 |
| 60 | 189953 | 5.09 |
| 70 | 150138 | 4.70 |
| 80 | 105312 | 4.96 |

Figure 2:
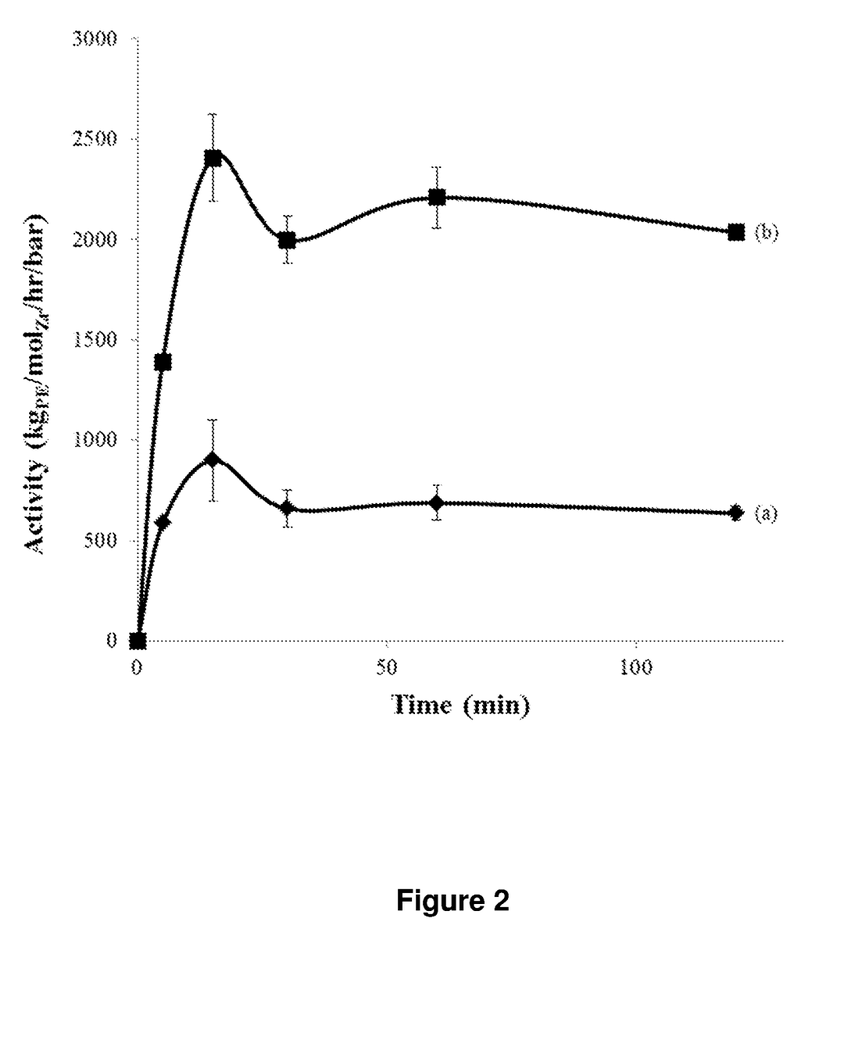
FIG. 2 is a chart showing polymerisation activities of the catalyst supported metallocene complexes at times from 0 to 120 minutes.

FIG. 2 Polymerisation activities of the catalyst supported metallocene complexes at times from 0 to 120 minutes. (a) AMO-LDH/MAO-[(EBI)ZrCl$_2$] and (b) silica@AMO-LDH/MAO-[(EBI)ZrCl$_2$]. Polymerisation conditions: 50 mL Hexane, 2 bar Ethylene, 1 h, [TIBA]$_0$/[Zr]$_0$.

The silica@AMO-LDH and AMO-LDH supported metallocene complexes have been evaluated for ethylene polymerisation over a timescale of 0-120 minutes, at 70° C., FIG. 2. AMO-LDH/MAO-[(EBI)ZrCl$_2$] (a) shows an initial increase in activity reaching a maximum at 15 min, 899 kg$_{PE}$/molz$_r$/h/bar, FIG. 2. After this point, there is a drop in activity, it appears that AMO-LDH/MAO-[(EBI)ZrCl$_2$] is over its peak in activity and has approximately settled to the diffusion controlled limit. This can be explained by the rapidly increasing amounts of polyethylene in the polymerising medium that can hinder the interaction of the catalyst support with the ethylene. Silica@AMO-LDH/MAO-[(EBI)ZrCl$_2$] (b) shows a similar pattern to AMO-LDH/MAO-[(EBI)ZrCl$_2$], FIG. 2. The optimum time for polymerisation is again 15 min with the activity reaching 2406 kg$_{PE}$/molz$_r$/h/bar, 2.5 times higher than AMO-LDH at the same time. The curves are expected to level off completely as the diffusion control limit is reached.

TABLE 3

Polymerisation data demonstrating the molecular weights ($M_w$) and polydispersities ($M_w/M_n$) with Time varying from 0 to 120 minutes at 70° C. using silica@AMO-LDH/MAO-[(EBI)ZrCl$_2$]

| Time (minutes) | $M_w$ (g/mol) | $M_w/M_n$ |
|---|---|---|
| 15 | 143088 | 4.12 |
| 30 | 137341 | 4.69 |
| 60 | 152496 | 4.99 |
| 120 | 147827 | 4.57 |

TABLE 4

Polymerisation data demonstrating the molecular weights ($M_w$) and polydispersities ($M_w/M_n$) with Time varying from 0 to 120 minutes at 70° C. using AMO-LDH/MAO-[(EBI)ZrCl$_2$]

| Time (minutes) | $M_w$ (g/mol) | $M_w/M_n$ |
|---|---|---|
| 5 | 175468 | 4.15 |
| 15 | 194344 | 4.51 |
| 30 | 171280 | 4.30 |
| 60 | 150138 | 4.70 |
| 120 | 144305 | 5.82 |

Figure 3:
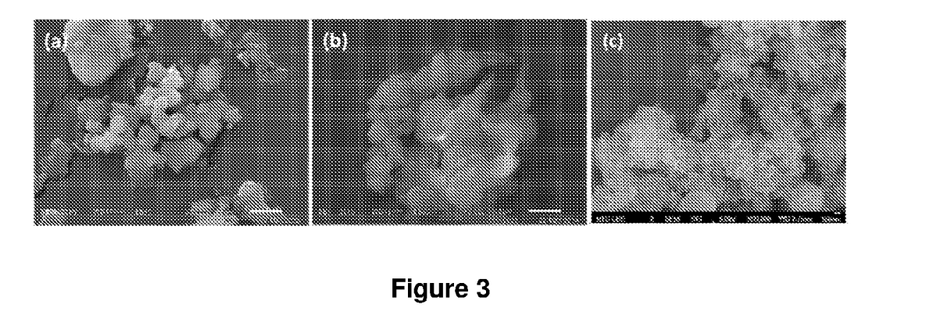
FIG. 3 shows SEM images of polymer produced using the silica@AMO-LDH metallocene catalyst support complex after 15 min, 1 h, and the original silica@AMO-LDH.

After 15 minutes of polymerisation (a) small spherical particles within the range 0.6-1.4 μm are present within the sample. These particles appear to be aggregated together. Strings of growing polymer can be seen. After 1 h, the polymer size and morphology is still not uniform (2.8-3.4 μm).

FIG. 3 SEM images of polymer produced using the silica@AMO-LDH metallocene catalyst support complex after (a) 15 min and (b) 1 h. (c) Silica@LDH.

In FIG. 3, the silica@AMO-LDH metallocene catalyst is silica@AMO-LDH/MAO-[(EBI)ZrCl$_2$]. Image (a) shows the polyethylene particles produced after 15 minutes. Spherical polymer particles 1.3-1.9 μm are present in the sample along with larger 6.3-10.3 μm particles. The polymer has mirrored the catalyst support morphology to a certain extent; the original silica@AMO-LDH is shown in image (c). After 1 h (b) the individual polymer particles have grown and aggregated together forming a very large polymer particle of 27 μm.

Figure 4:
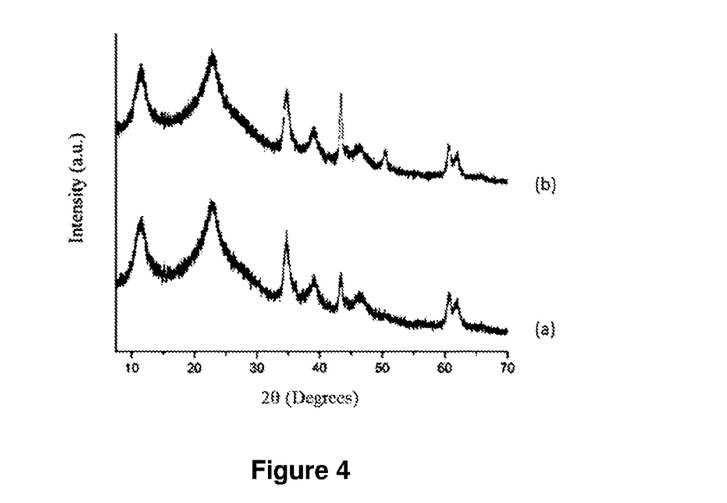
FIG. 4 shows XRD patterns of SiO2@LDH microspheres prepared according to example 1 conventional water washing and acetone washing.

FIG. 4. XRD patterns of SiO$_2$@LDH microspheres prepared according to example 1 (a) conventional water washing (b) acetone washing.

Figure 5:
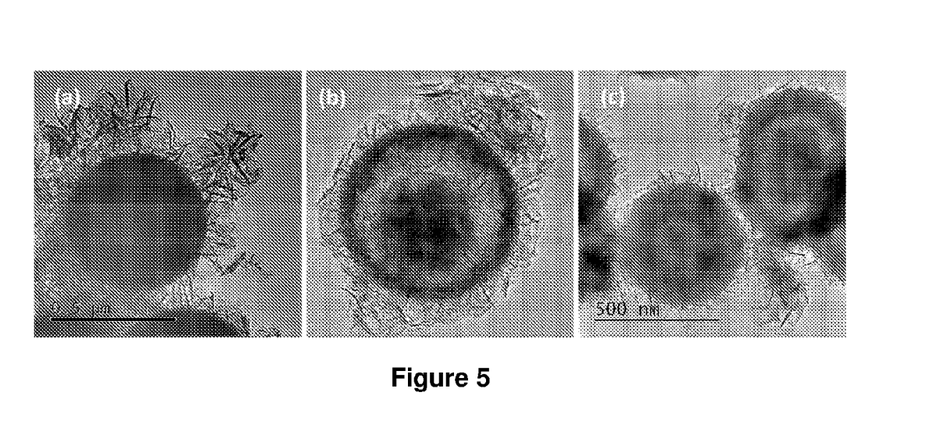
FIG. 5 shows TEM images of SiO2@LDH microspheres with solid (example 1), yolk-shell (example 1 at 40° C.), and hollow (example 1 at pH 11) morphologies.

FIG. 5. TEM image of SiO$_2$@LDH microspheres with different morphology (a) solid (example 1), (b) yolk-shell (example 1 at 40° C.) and (c) hollow (example 1 at pH 11).

Figure 6:
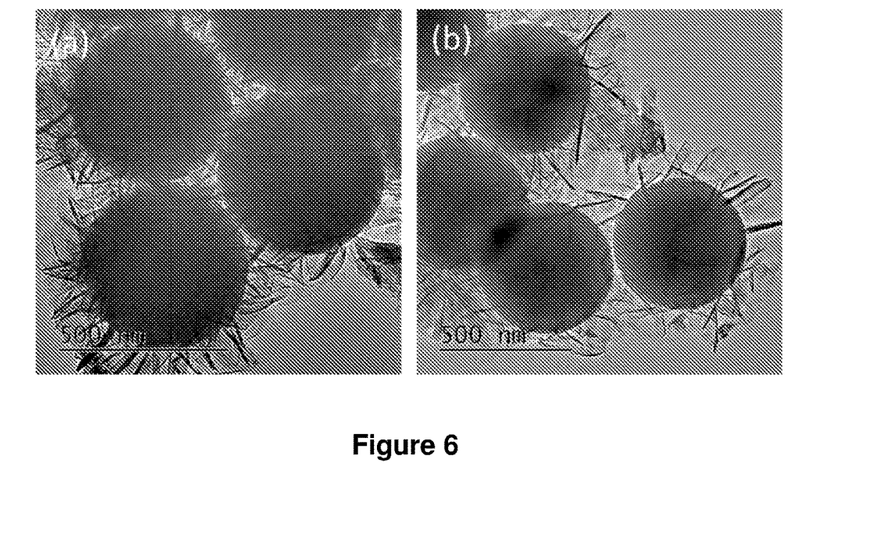
FIG. 6 shows TEM images of SiO2@AMO LDH microspheres according to examples 5 and 7 at pH=10 and room temperature.

FIG. 6 TEM image of SiO$_2$@AMO LDH microspheres according to examples 5 and 7 at pH=10 and room temperature (a) Mg:Al=3:1 (b) Mg:Al:Fe=3:0.9:0.1.

Figure 7:
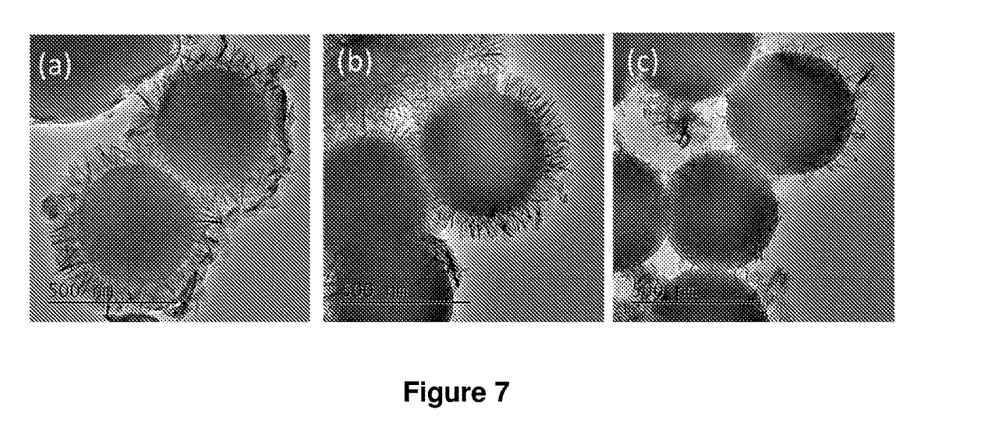
FIG. 7 shows TEM images of SiO2@AMO-LDH (Mg:Ni:Al ratio of 2.7:0.3:1) microspheres with different morphologies according to example 6 at pH 10 and room temperature, pH 10 and 40° C., and pH 11 and 40° C.

FIG. 7 TEM image of SiO$_2$@AMO-LDH with Mg:Ni: Al=2.7:0.3:1 microspheres with different morphology according to example 6 (a) pH=10 and room temperature (b) pH=10 and 40° C. (c) pH=11 and 40° C.

Further, non-limiting, examples of SiO$_2$@AMO-LDHs suitable for use in the present invention are detailed below:

Example 1

Silica spheres (100 mg, 550 nm) were dispersed in deionised water (20 mL) using ultrasound treatment. After 30 min., Na$_2$CO$_3$ (0.96 mmol) was added to the solution and a further 5 min of sonication was carried out to form solution A. Next an aqueous solution (19.2 mL) containing Mg (NO$_3$)$_2$.6H$_2$O (0.96 mmol) and Al(NO$_3$)$_3$.9H$_2$O (0.48 mmol) was added at a rate of 60 mL/h to solution A under vigorous stirring at room temperature. The pH of the reaction solution was controlled to be 10 with the addition of 1 M NaOH. The obtained solid was collected with centrifugation at 4000 rpm for 5 min and then re-dispersed in deionised water (40 mL) and stirred for 1 h. The collection and re-dispersion were repeated twice. Afterward, the solid was washed with acetone (40 mL) and then re-dispersed in acetone (40 mL) and left to stir overnight. The solid was then dried under vacuum.

The SiO$_2$@LDH obtained in this Example, before the treatment with acetone, has the formula:

The SiO$_2$@AMO-LDH, obtained after acetone treatment, has the formula:

Yolk shell particles were obtained by carrying out the addition of the aqueous solution containing the Mg (NO$_3$)$_2$.6H$_2$O and Al(NO$_3$)$_3$.9H$_2$O at 40° C. and pH10.

Hollow shell particles were obtained by carrying out the addition of the aqueous solution containing Mg (NO$_3$)$_2$.6H$_2$O and Al(NO$_3$)$_3$.9H$_2$O at room temperature but at pH11.

Surface Area Analysis

The solid SiO$_2$@LDH, the yolk shell SiO$_2$@LDH and the hollow shell SiO$_2$@LDH prepared as described above but without acetone treatment were subjected to Brunauer-Emmett-Teller (BET) surface area analysis.

The N$_2$ BET surface areas of the products were:

|  | BET surface area (m$^2$g$^{-1}$) |
|---|---|
| Solid (i.e. core-shell) SiO$_2$@LDH | 107 |
| Yolk-shell SiO$_2$@LDH | 118 |
| Hollow-shell SiO$_2$@LDH | 177 |

The BET surface areas reported above may be favourably compared to those of SiO$_2$@LDHs prepared according to (A) Shao et al. Chem. Mater. 2012, 24, pages 1192-1197 and to those of SiO$_2$@LDHs prepared according to (B) Chen et al. J. Mater. Chem. A, 1, 3877-3880.

|  | BET surface area (m$^2$g$^{-1}$) |
|---|---|
| (A) SiO$_2$ microspheres pre-treated with Al(OOH). Product SiO$_2$@NiAl LDH. | |
| Solid (i.e. core-shell) SiO$_2$ microspheres | 42.3 |
| Yolk-shell SiO$_2$@LDH microspheres | 68 |
| Hollow-shell SiO$_2$@LDH microspheres | 124 |
| (B) SiO$_2$ microspheres - no pre-treatment - ammonia method. Product SiO$_2$@LDH. | |
| Solid (i.e. core-shell) SiO$_2$@LDH microspheres | 61 |

Core-shell SiO$_2$@LDHs were prepared according to the procedures described in Example 1 and in the Examples 2 and 3 below having different thicknesses of LDH layer. The ratio of Mg/Al was varied to control the thickness of the LDH layer. A Mg:Al ratio of 1:1 was found to give an LDH layer of thickness 65 nm, a ratio of 2:1 was found to give an LDH layer of thickness 110 nm and a layer of thickness of 160 nm was obtained using a Mg:Al ratio of 3:1. TEM images are shown in FIG. 15. Core-shell SiO$_2$@LDHs were also prepared according to the procedure described in Example 1 above using different sized SiO$_2$ microspheres, 300 nm, 550 nm and 800 nm. TEM images are shown in FIG. 16. TEM images of the SiO$_2$@LDHs produced with different morphology (a) solid (Example 1), (b) yolk shell (Example 1 at 40° C.) and (c) hollow (Example 1 at pH11), as described above, are shown in FIG. 17.

Example 2

In order to obtain a 1:1 Mg:Al LDH, the procedure described above in Example 1 was repeated with the exception that an aqueous solution (19.2 mL) containing Mg(NO$_3$)$_2$.6H$_2$O (0.72 mmol) and Al(NO$_3$)$_3$.9H$_2$O (0.72 mmol) was added at a rate of 60 mL/h to solution A under vigorous stirring.

Example 3

In order to obtain a 3:1 Mg:Al LDH, the procedure described above in Example 1 was repeated with the exception that an aqueous solution (19.2 mL) containing Mg(NO$_3$)$_2$.6H$_2$O (1.08 mmol) and Al(NO$_3$)$_3$.9H$_2$O (0.36 mmol) was added at a rate of 60 mL/h to solution A under vigorous stirring. The XRD patterns of the SiO$_2$@LDH samples prepared with Mg:Al ratios of 1:1 (Example 2) and 3:1 (Example 3) are shown in FIG. 12.

Example 4

The silica@LDH particles were synthesised via the coprecipation method. Silica spheres (100 mg, 550 nm) were dispersed in deionised water (20 mL) using ultrasound treatment. After 30 min, the anion salt (0.96 mmol), Na$_2$CO$_3$, was added to the solution containing ammonia (0.8 mL, 35%) and a further 5 min of sonication was carried out to form solution A. Next an aqueous solution (19.2 mL) containing Mg(NO$_3$)$_2$.6H$_2$O) (0.96 mmol) and Al (NO$_3$)$_3$.9H$_2$O (0.48 mmol) was added at a rate of 60 mL/h to solution A under vigorous stirring. The obtained solid was collected with centrifugation at 4000 rpm for 5 min and then re-dispersed in deionised water (40 mL) and stirred for 1 h. The collection and re-dispersion were repeated twice. Afterward, the solid was washed with acetone (40 mL) and then re-dispersed in acetone (40 mL) and left to stir overnight.

The solid was then dried under vacuum. The suspension was then dried under vacuum for materials characterisation.

The features disclosed in the foregoing description, in the claims as well as in the accompanying drawings, may both separately and in any combination thereof be material for realizing the invention in diverse forms thereof.

Example 5

In order to obtain Silica@AMO-LDHs in Mg:Al=3:1. Synthesise the Silica@LDH particles by using the co-precipitation method, disperse silica spheres (100 mg) in the deionised water (20 mL) by using ultrasound treatment for 30 min, add the anion salt $Na_2CO_3$ (0.96 mmol) in the solution and further treat by ultrasound for 5 min, the finally solution named A. Then add an aqueous solution (19.2 mL) containing (1.08 mmol) $Mg^{2+}$ and (0.36 mmol) $Al^{3+}$ in the solution A at the rate of 60 mL/h with vigorous stirring. The pH of the reaction solution is controlled with the addition of 1 M NaOH by an autotitrator. And the morphology of Silica@LDH is controlled by pH and temperature. The obtained solid is collected with centrifugation at 5000 rpm for 5 min and then re-dispersed in deionised water (40 mL) and stir for 1 h, the washing need repeated twice. Before final isolation, the solid is washed with acetone (40 mL) and left to stir over night, and the suspension is then dried under vacuum

Example 6

In order to obtain Silica@AMO-LDHs in Mg:Ni:Al=2.7:0.3:1. The Silica@LDH particles will be synthesized by using the co-precipitation method, disperse silica spheres (100 mg) in the deionised water (20 mL) by using ultrasound treatment for 30 min, add the anion salt $Na_2CO_3$ (0.96 mmol) in the solution and further treat by ultrasound for 5 min, the finally solution named A. Then add an aqueous solution (19.2 mL) containing (0.972 mmol) $Mg^{2+}$, (0.108 mmol) $Ni^{2+}$ and (0.36 mmol) $Al^{3+}$ in the solution A at the rate of 60 mL/h with vigorous stirring. The pH of the reaction solution is controlled with the addition of 1 M NaOH by an autotitrator. As followed the morphology of Silica@LDH is controlled by pH and temperature. The obtained solid is collected with centrifugation at 5000 rpm for 5 min and then re-dispersed in deionised water (40 mL) and stir for 1 h, the washing need repeated twice. Before final isolation, the solid is washed with acetone (40 mL) and left to stir over night, and the suspension is then dried under vacuum.

Example 7

In order to obtain Silica@AMO-LDHs in Mg:Al:Fe=3:0.9:0.1. The Silica@LDH particles synthesise using the co-precipitation method, disperse silica spheres (100 mg) in the deionised water (20 mL) by using ultrasound treatment for 30 min, add the anion salt $Na_2CO_3$ (0.96 mmol) in the solution and further treat by ultrasound for 5 min, the finally solution named A. Then add an aqueous solution (19.2 mL) containing (1.08 mmol) $Mg^{2+}$, (0.324 mmol) $Al^{3+}$ and (0.036 mmol) $Fe^{3+}$ in the solution A at the rate of 60 mL/h with vigorous stirring. The pH of the reaction solution is controlled with the addition of 1 M NaOH by an autotitrator. As followed the morphology of Silica@LDH is controlled by pH and temperature. The obtained solid is collected with centrifugation at 5000 rpm for 5 min and then re-dispersed in deionised water (40 mL) and stir for 1 h, the washing need repeated twice. Before final isolation, the solid is washed with acetone (40 mL) and left to stir over night, and the suspension is then dried under vacuum The features disclosed in the foregoing description, in the claims and in the accompanying drawings may, both separately and in any combination thereof, be material for realizing the invention in diverse forms thereof.

The invention claimed is:

1. A catalyst system comprising a solid support material having, on its surface, one or more catalytic transition metal complex wherein the solid support material comprises $SiO_2$@AMO-LDH microspheres having the formula I $(SiO_2)_p@\{[M^{z+}_{(1-x)}M'^{y+}_x(OH)_2]^{a+}(X^{n-})_{a/n}\cdot bH_2O\cdot c(\text{AMO-solvent})\}_q$ wherein, $M^{z+}$ and $M'^{y+}$ are two different charged metal cations;

z=1 or 2;

y=3 or 4;

0<x<0.9;

b is 0 to 10;

c is 0.01 to 10;

p>0;

q>0;

$X^{n-}$ is an anion with n>0;

a=z(1−x)+xy−2; and the AMO-solvent is an 100% aqueous miscible organic solvent.

2. The catalyst system according to claim 1, wherein the solid support material has the formula I in which M' is one or more trivalent metal cations.

3. The catalyst system according to claim 1, wherein the solid support material has the formula I in which M is one or more divalent cation.

4. The catalyst system according to claim 1, wherein the solid support material has the formula I in which $X^{n-}$ is selected from $CO_3^{2-}$, $OH^-$, $F^-$, $Cl^-$, $Br^-$, $I^-$, $SO^{2-}$, $NO_3^-$ and $PO_4^{3-}$, or a mixture thereof.

5. The catalyst system according to claim 1, wherein the solid support material has the formula I in which M is Mg, M' is Al and $X^{n-}$ is $CO_3^-$.

6. The catalyst system according to claim 1, wherein the solid support material has the formula I in which the AMO-solvent is ethanol, acetone or methanol.

7. The catalyst system according to claim 1, wherein the catalytic transition metal complex is at least one complex of a metal selected from zirconium, iron, chromium, cobalt, nickel, titanium and hafnium, the complex containing one or more aromatic or heteroaromatic ligands.

8. The catalyst system according to claim 1, wherein the catalytic transition metal complex is a metallocene containing zirconium or hafnium.

9. The catalyst system according to claim 1, wherein the catalytic transition metal complex is at least one compound selected from.

(EBI)ZrCl$_2$

10. The catalyst system according to claim 1, wherein the system is obtained by a process comprising the step of activating the solid support material with an alkylaluminoxane, triisobutylaluminium (TIBA), triethylaluminium (TEA) or diethylaluminium chloride (DEAC).

11. The catalyst system according to claim 10, wherein the alkylaluminoxane is methylaluminoxane (MAO) or modified methylaluminoxane (MMAO).

12. A method of making the catalyst system of claim 1 which comprises
(a) providing a solid support material comprising $SiO_2$@AMO-LDH microspheres having the formula (I)

$$(SiO_2)_p@\{[M^{z+}_{(1-x)}M'^{y+}_x(OH)_2]^{a+}(X^{n-})_{a/n} \cdot bH_2O \cdot c(\text{AMO-Solvent})\}_q \quad (I)$$

wherein,
$M^{z+}$ and $M'^{y+}$ are two different charged metal cations;
$z=1$ or 2;
$y=3$ or 4;
$0<x<0.9$;
b is 0 to 10;
c is 0.01 to 10;
$p>0$,
$q>0$;
$X^{n-}$ is an anion with $n>0$;
$a=z(1-x)+xy-2$; and
the AMO-solvent is an aqueous miscible organic solvent,
(b) treating the $SiO_2$@AMO-LDH microspheres with at least one catalytic transition metal complex having olefin polymerisation catalytic activity.

13. The method according to claim 12, wherein the solid support material has the formula I in which M' is one or more trivalent metal cations.

14. The method according to claim 12, wherein the solid support material has the formula I in which M is one or more divalent metal cations.

15. The method according to claim 12, wherein the solid support material has the formula I in which $X^{n-}$ is selected from $CO_3^{2-}$, $OH^-$, $F^-$, $Cl^-$, $Br^-$, $I^-$, $SO^{2-}$, $NO_3^-$ and $PO_4^{3-}$, or a mixture thereof.

16. The method according to claim 12, wherein the solid support material has the formula I in which $M^{z+}$ is Mg, $M'^{y+}$ is Al and $X^{n-}$ is $CO_3^-$.

17. The method according to claim 12, wherein the solid support material has the formula I in which AMO-solvent is ethanol, acetone or methanol.

18. The method according to claim 12, wherein the catalytic transition metal complex is at least one complex of a metal selected from zirconium, iron, chromium, cobalt, nickel, titanium and hafnium, the complex containing one or more aromatic or heteroaromatic ligands.

19. The method according to claim 12, wherein the catalytic transition metal complex is a metallocene containing zirconium or hafnium.

20. The method according to claim 12, wherein the catalytic transition metal complex is at least one compound selected from.

-continued

21. The method according to claim 12, further comprising a step of calcining the SiO$_2$@AMO-LDH microspheres, before the treating step (b).

22. The method according to claim 21, further comprising a step of treating the calcined SiO$_2$@AMO-LDH with an alkylaluminoxane before the treating step (b).

23. The method according to claim 22, wherein the alkylaluminoxane is methylaluminoxane (MAO) or modified methylaluminoxane (MMAO).

24. A process for forming a polyethylene homopolymer or a polyethylene copolymer which comprises reacting olefin monomers in the presence of a system according to claim 1.

25. A process for producing a polymer of an olefin which comprises contacting the olefin with the solid catalyst system according claim 1.

26. The process according to claim 25, wherein the olefin is ethylene.

27. The process according to claim 25, wherein the process is performed at a temperature of 50-100° C.

28. The process according to claim 24, wherein the copolymer comprises 1-10 wt % of a (4-8 C) α-olefin.

* * * * *